(12) United States Patent
Steibel et al.

(10) Patent No.: US 7,507,466 B2
(45) Date of Patent: Mar. 24, 2009

(54) MANUFACTURE OF CMC ARTICLES HAVING SMALL COMPLEX FEATURES

(75) Inventors: James D. Steibel, Mason, OH (US); Stephen M. Whiteker, Covington, KY (US); Douglas M. Carper, Trenton, OH (US); Suresh Subramanian, Mason, OH (US)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 11/359,217

(22) Filed: Feb. 22, 2006

(65) Prior Publication Data

US 2007/0196693 A1    Aug. 23, 2007

(51) Int. Cl.
*B32B 17/12* (2006.01)
(52) U.S. Cl. ............... 428/293.4; 428/293.7; 501/95.2
(58) Field of Classification Search ............... 428/357, 428/292.4, 294.4, 293.7, 293.4; 501/95.2; 244/123.1
See application file for complete search history.

(56) References Cited

U.S. PATENT DOCUMENTS

| | | | |
|---|---|---|---|
| 4,808,076 A | 2/1989 | Jarmon et al. | |
| 4,960,629 A | 10/1990 | Jarmon et al. | |
| 5,110,652 A | 5/1992 | Allaire et al. | |
| 5,188,878 A | 2/1993 | Takezawa et al. | |
| 5,252,381 A * | 10/1993 | Adler | 428/156 |
| 5,433,915 A | 7/1995 | Yamamoto et al. | |
| 5,445,693 A | 8/1995 | Vane | |
| 5,589,115 A | 12/1996 | Sherwood | |
| 6,235,379 B1 * | 5/2001 | Kameda et al. | 428/293.4 |
| 6,555,174 B2 | 4/2003 | Yamaji et al. | |
| 2001/0026868 A1 | 10/2001 | Hanzawa et al. | |
| 2002/0141610 A1 | 10/2002 | Devantier et al. | |
| 2002/0155269 A1 | 10/2002 | Holowczak et al. | |
| 2005/0084377 A1 | 4/2005 | Dambrine et al. | |
| 2005/0186069 A1 * | 8/2005 | Subramanian et al. | 415/200 |

FOREIGN PATENT DOCUMENTS

| | | |
|---|---|---|
| JP | 01271232 A | 10/1989 |
| JP | 06305863 A | 11/1994 |
| JP | 2002266216 A | 9/2002 |
| JP | 2004098493 A | 4/2004 |
| JP | 2004174730 A | 6/2004 |

OTHER PUBLICATIONS

Celanes TM, Complete Textile Glossary, pp. 164 and 117, date 2001.*

* cited by examiner

*Primary Examiner*—N. Edwards
(74) *Attorney, Agent, or Firm*—McNees Wallace & Nurick, LLC

(57) ABSTRACT

The present invention is ceramic matrix composite gas turbine engine component comprising a plurality of cured ceramic matrix composite plies, each ply comprising ceramic fiber tows, each ceramic fiber tow comprising a plurality of ceramic fibers, the tows in each ply lying adjacent to one another such that each ply has a unidirectional orientation. The component further comprises a layer of a coating on the ceramic fibers. The component further comprises a ceramic matrix material lying in interstitial regions between the fibers and tows of each ply and the interstitial region between the plurality of plies, wherein at least a portion of the component is no greater than about 0.021 inch thick. The present invention is also a method for making such a ceramic matrix composite component.

13 Claims, 6 Drawing Sheets

MANUFACTURE OF CMC ARTICLES HAVING SMALL COMPLEX FEATURES

FIELD OF THE INVENTION

The present invention relates generally to ceramic matrix turbine engine components, and more particularly, to a ceramic matrix composite gas turbine engine component have small complex features.

BACKGROUND OF THE INVENTION

In order to increase the efficiency and the performance of gas turbine engines so as to provide increased thrust-to-weight ratios, lower emissions and improved specific fuel consumption, engine turbines are tasked to operate at higher temperatures. As the higher temperatures reach and surpass the limits of the material comprising the components in the hot section of the engine and in particular the turbine section of the engine, new materials must be developed.

As the engine operating temperatures have increased, new methods of cooling the high temperature alloys comprising the combustors and the turbine airfoils have been developed. For example, ceramic thermal barrier coatings (TBCs) were applied to the surfaces of components in the stream of the hot effluent gases of combustion to reduce the heat transfer rate and to provide thermal protection to the underlying metal and allow the component to withstand higher temperatures. These improvements helped to reduce the peak temperatures and thermal gradients. Cooling holes were also introduced to provide film cooling to improve thermal capability or protection. Simultaneously, ceramic matrix composites were developed as substitutes for the high temperature alloys. The ceramic matrix composites (CMCs) in many cases provided an improved temperature and density advantage over the metals, making them the material of choice when higher operating temperatures were desired.

A number of techniques have been used in the past to manufacture turbine engine components, such as turbine blades using ceramic matrix composites. However, such techniques have resulted in difficulties related to the small features of gas turbine engine components for helicopter engines.

A number of techniques have been used in the past to manufacture turbine engine components, such as turbine blades using ceramic matrix composites. One method of manufacturing CMC components, set forth in U.S. Pat. Nos. 5,015,540; 5,330,854; and 5,336,350; incorporated herein by reference in their entirety and assigned to the assignee of the present invention, relates to the production of silicon carbide matrix composites containing fibrous material that is infiltrated with molten silicon, herein referred to as the Silcomp process. The fibers generally have diameters of about 140 micrometers or greater, which prevents intricate, complex shapes having features on the order of about 0.030 inches, such as turbine blade components for helicopter gas turbine engines, to be manufactured by the Silcomp process.

Other techniques, such as the prepreg melt infiltration (MI) process have also been used, however, the smallest cured thicknesses with sufficient structural integrity for such components have been in the range of about 0.03 inch to about 0.036 inch, since they are manufactured with standard prepreg plies, which normally have an uncured thickness in the range of about 0.009 inch to about 0.011 inch. With standard matrix composition percentages in the final manufactured component, the use of such uncured thicknesses results in final cured thicknesses in the range of about 0.03 inch to about 0.036 inch.

What is needed is a method of manufacturing CMC helicopter turbine engine components that permits the manufacture of features having a thickness in the range of about 0.015 inch to about 0.021 inch. In addition, a method of manufacturing CMC helicopter turbine engine components having features with a thickness less than about 0.021 inch is also needed.

SUMMARY OF THE INVENTION

An embodiment of the present invention is ceramic matrix composite gas turbine engine component comprising a plurality of cured ceramic matrix composite plies, each ply comprising ceramic fiber tows, each ceramic fiber tow comprising a plurality of ceramic fibers, the tows in each ply lying adjacent to one another such that each ply has a unidirectional orientation. The component further comprises a coating on the ceramic fibers, the coating selected from the group consisting of boron nitride, silicon nitride, silicon carbide, and combinations thereof. The component further comprises a ceramic matrix material lying in interstitial regions between the fibers and tows of each ply and the interstitial region between the plurality of plies, wherein at least a portion of the component comprising three cured ceramic matrix composite plies, wherein each ceramic ply in at least the portion has a thickness in the range of about 0.005 inch to about 0.007inch, inclusive of tows, coating, and interstitial ceramic matrix material, wherein the total thickness in at least the portion is no greater than about 0.021 inch.

Another embodiment of the present invention is a method for manufacturing an uncooled ceramic matrix composite gas turbine engine component. The method comprises providing a plurality of prepreg ceramic plies, the plies comprising prepreg ceramic fiber tows, the tows in each ply lying adjacent to one another in a planar arrangement such that each ply has a unidirectional orientation. The method further comprises laying up the plurality of prepreg ceramic plies in a preselected arrangement to form a component shape. The method further comprises heating the component shape to form a ceramic preform. The method further comprises densifying the turbine blade preform with at least silicon to form an uncooled ceramic matrix composite turbine blade, wherein at least a portion of the component comprises cured ceramic plies having a thickness in the range of about 0.005 inch to about 0.007 inch, inclusive of tows, coating, and interstitial ceramic matrix material.

Yet another embodiment of the present invention is another method for manufacturing a cooled ceramic matrix composite gas turbine engine component. The method comprises providing a plurality of prepreg ceramic plies, the plies comprising prepreg ceramic fiber tows, the tows in each ply lying adjacent to one another in a planar arrangement such that each ply has a unidirectional orientation. The method further comprises laying up the plurality of prepreg ceramic plies in a preselected arrangement around tooling to form a component shape. The method further comprises heating the component shape to form a ceramic preform. The method further comprises removing the tooling. The method further comprises densifying the preform with at least silicon to form a ceramic matrix composite component wherein at least a portion of the component comprises cured ceramic plies having a thickness in the range of about 0.005 inch to about 0.007 inch, inclusive of tows, coating, and interstitial ceramic matrix material. The method further comprises drilling cooling holes in the ceramic matrix composite component to form a cooled ceramic matrix composite component.

An advantage of the present invention is that the use of a lower volume percentage of interstitial ceramic matrix material permits the manufacture of CMC articles having small features.

Another advantage of the present invention is that the use of thin prepreg plies permits the manufacture of CMC articles having small features.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
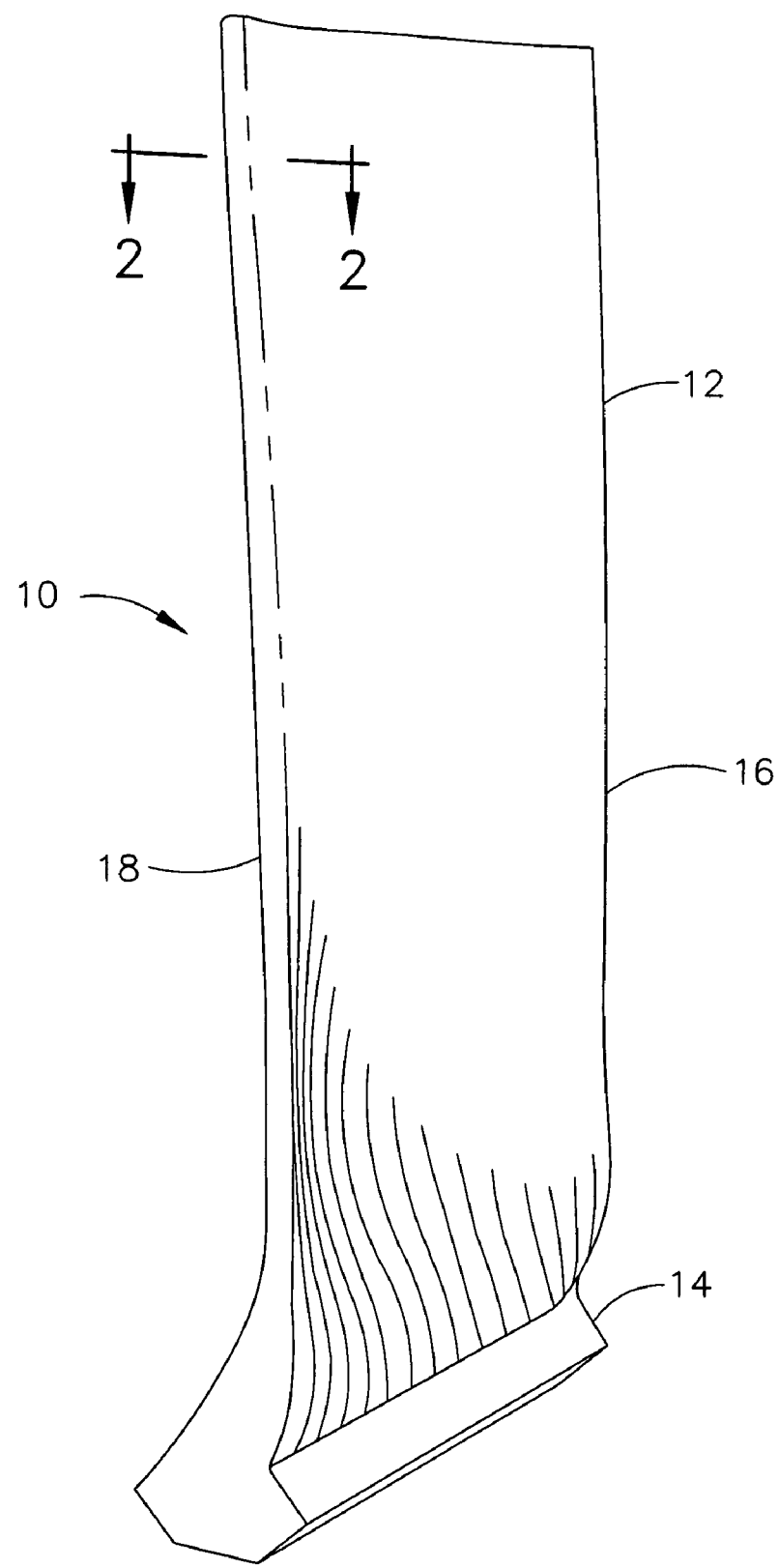
FIG. 1 is an example of an uncooled CMC Low Pressure Turbine (LPT) blade for a gas turbine engine.

FIG. 1 depicts an exemplary uncoated helicopter gas turbine engine LPT uncooled blade 10. In this illustration a turbine blade 10 comprises a ceramic matrix composite material. The turbine blade 10 includes an airfoil 12 against which the flow of hot exhaust gas is directed. The turbine blade 10 is mounted to a turbine disk (not shown) by a dovetail 14 that extends downwardly from the airfoil 12 and engages a slot of complimentary geometry on the turbine disk. The LPT blade 10 of the present invention does not include an integral platform. A separate platform is provided to minimize the exposure of the dovetail 14 to hot gases of combustion. The airfoil has a leading edge section 16 and a trailing edge section 18. The blade 10 is a relatively small component, and as shown in FIG. 1, the trailing edge section has a thickness in the range of about 0.015 inch to about 0.021 inch.

A CMC turbine blade according to an embodiment is preferably a SiC/SiC composite material manufactured using the "prepreg" MI method. Exemplary processes for making such SiC/SiC prepreg material are described in U.S. Pat. Nos. 6,024,898 and 6,258,737, which are assigned to the Assignee of the present invention and which are hereby incorporated herein by reference in their entirety. Such "prepregged" plies comprise silicon carbide-containing fibers, where the fibers are bundled into tows and the tows are all adjacent to one another such that all of the fibers are oriented in the same direction. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

In order to manufacture the turbine blade 10 of the present invention, a preselected number of SiC prepregged plies are laid up in a preselected arrangement forming a turbine blade shape, where the trailing edge section 18 has a cured thickness in the range of about 0.015 inch to about 0.021 inch. In order to have a trailing edge with sufficient structural integrity to withstand operation in a gas turbine engine, it is preferred to have at least two interface regions between the plies (i.e. three plies) to provide sufficient structural support.

These three plies that comprise trailing edge are preferably oriented such that all three plies are not oriented in the same direction. By "0° orientation" with respect to a prepreg ply, it is meant that a ply is laid up such that the line of the fiber tows is in the line of the long dimension or axis of the turbine blade as known in the art. A 90° orientation means that the ply is laid up such that the line of the fiber tows is perpendicular to the long dimension or axis of the turbine blade as known in the art. All orientations other than 0° and 90° may be negative or positive depending on whether the ply is rotated clockwise (positive) from a preselected plane in the long dimension of the turbine blade or rotated counterclockwise (negative) from the preselected plane in the long dimension of the turbine blade as known in the art. Prepreg plies that are oriented at 0° have tensile strength in the final CMC product that is about twenty times greater than prepreg plies that are oriented at 90°. The remaining plies that do not pass through the small feature may be arranged in any appropriate orientation as known in the art. For example, the remaining plies could all be laid up in an alternating formation such that the remaining plies are at about a 0° orientation, followed by about a 90° orientation, followed by about a 0° orientation, followed by a −90° orientation, etc. as is known in the art, or such that the remaining plies are at a −45° orientation, followed by a 0° orientation, followed by a +45° orientation, followed by a 90° orientation, or in any other mechanically acceptable arrangement The next step of the process is forming a ceramic preform by heating the turbine blade shape by compression molding, bladder molding, or autoclaving as known in the art. The final step of the process is densifying the preform with at least silicon, and preferably with boron-doped silicon to form an uncooled CMC turbine blade as known in the art. In one embodiment of carrying out the infiltration, the preform is contacted with molten silicon, which is infiltrated into the preform. U.S. Pat. No. 4,737,328, which is assigned to the assignee of the present invention, and which is hereby incorporated by reference in its entirety, discloses an infiltration technique.

In order to achieve a small trailing edge 18 thickness in the range of about 0.015 inch to about 0.021 inch, one approach is to use plies that comprise smaller ceramic fiber tows, where each tow has a denier in the range of about 800 to about 1000 and wherein the thickness of each tow is in range of about 0.002 inch to about 0.003 inch.

Figure 2:
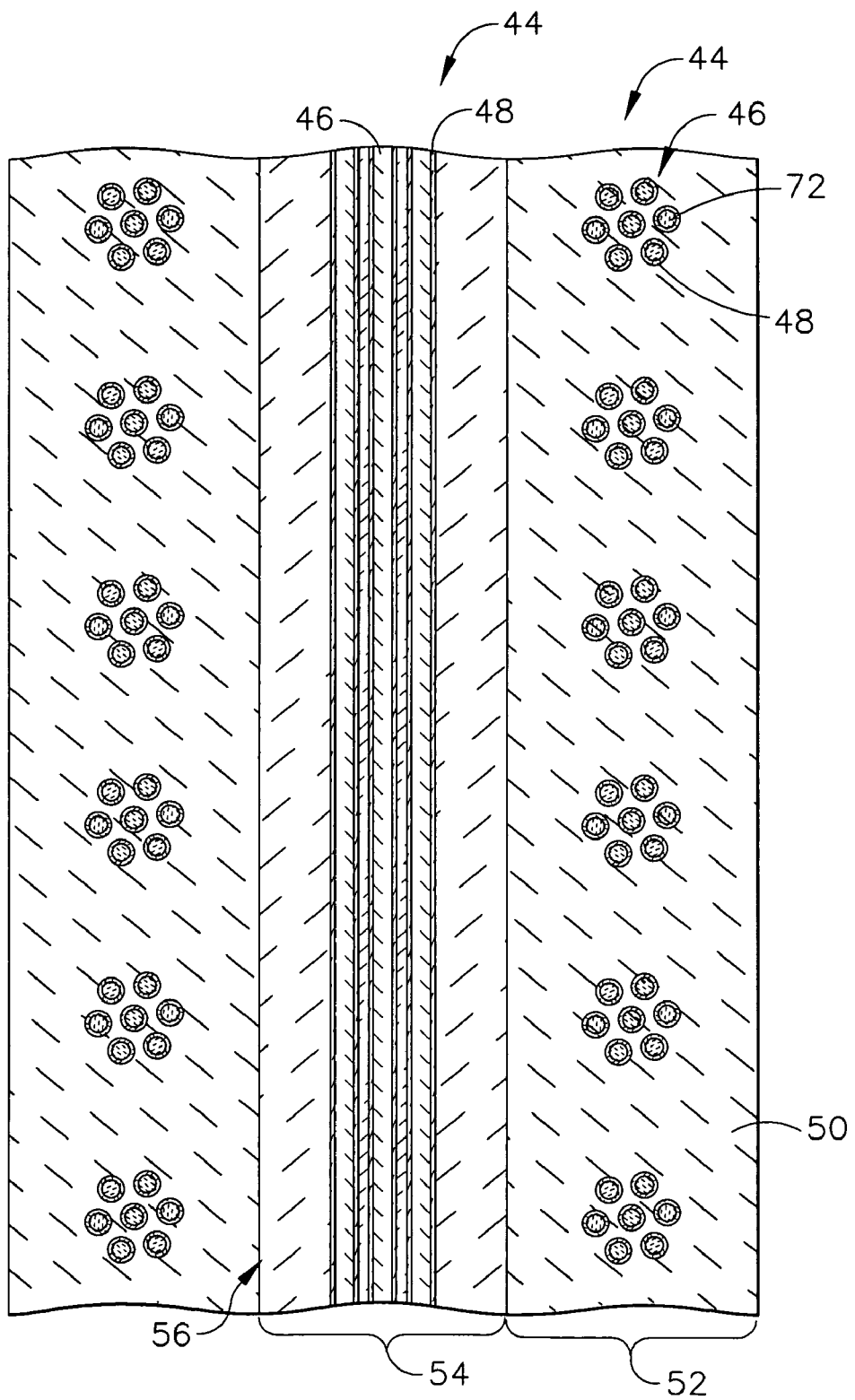
FIG. 2 is a cross-section of the uncooled CMC LPT blade of FIG. 1, taken at the line 2-2 illustrating one embodiment of the present invention.

As shown in the exemplary cross-section of the trailing edge section 18 in FIG. 2, the edge section 18 comprises three cured prepreg plies 44. Each ply 44 comprises prepreg tows 46, the tows 46 comprising a plurality of fibers 72 coated with a coating 48 selected from the group consisting of boron nitride, silicon nitride, silicon carbide and combinations thereof, as such coating 48 is known in the art, wherein the denier of each tow 46 is in the range of about 800 to about 1000, such that each ply 44 has a thickness in the range of about 0.005 inch to about 0.007 inch. An interstitial ceramic material 50 is present between and surrounding the plies 44, tows 46, and fibers 72, such that the total thickness of the three cured plies 44 is in the range of about 0.015 inch to about 0.021 inch. The interstitial ceramic material 50 also forms the two interface regions 56 between the plies. Preferably, the three plies do not have the same orientation. In the exemplary embodiment shown in FIG. 2, two outer plies 52 are oriented at 0°, while the middle ply 54 is oriented at 90°.

A second approach is to use a relatively small amount of ceramic matrix material, such that the volume percentage of the matrix material in the blade 10 is in the range of about 60 percent to about 70 percent. Increasing the volume percent of the matrix may be accomplished by decreasing carbon content in the matrix and/or decreasing particle content to ensure ability to fully fill with silicon. Such a relatively low percentage of matrix material means that in order to achieve a thickness in the range of about 0.015 inch to about 0.021 inch, prepreg plies having a thickness in the range of about 0.005 inch to about 0.007 inch can be used.

Figure 3:
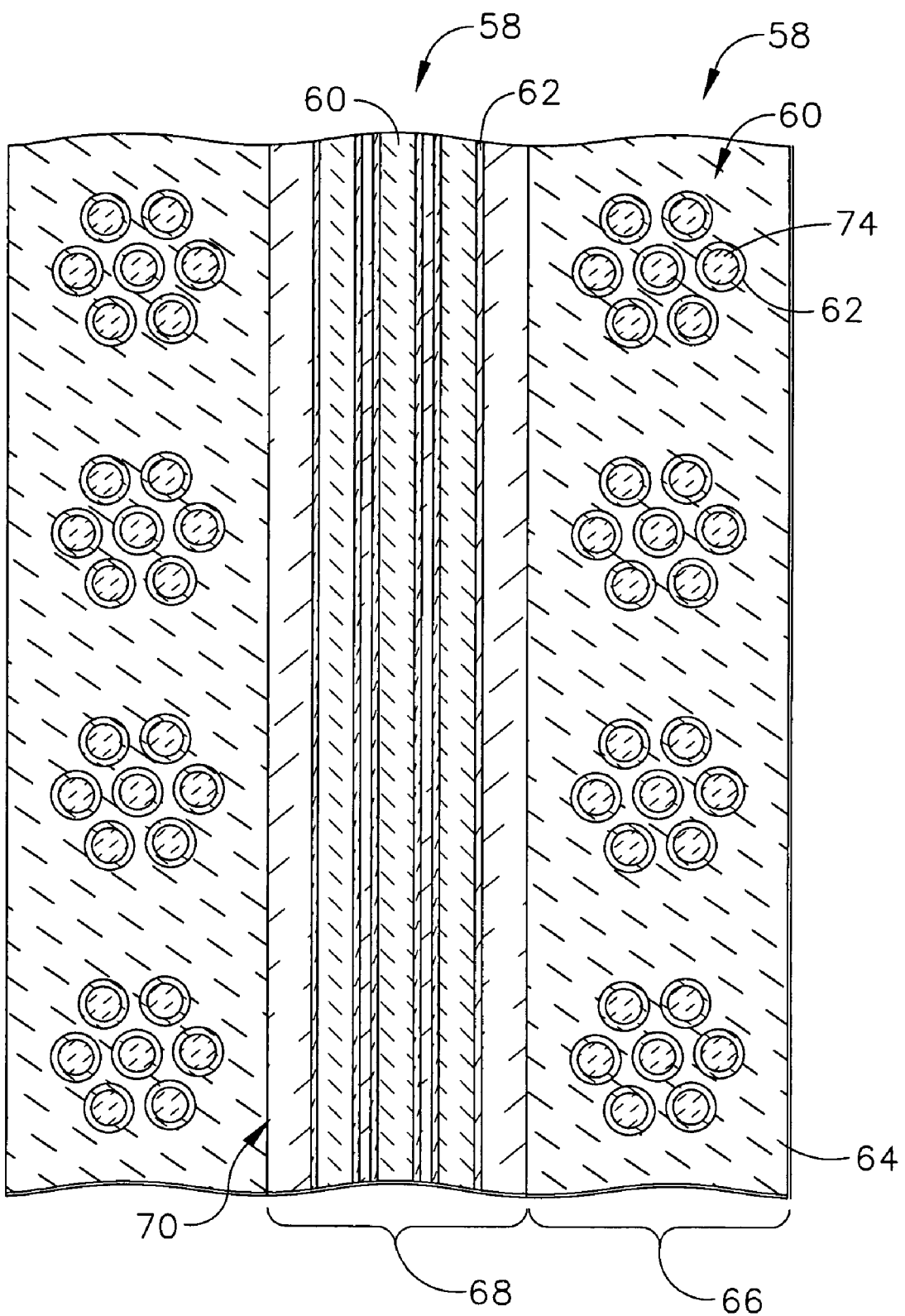
FIG. 3 is a cross-section of the uncooled CMC LPT blade of FIG. 1, taken at the line 2-2 illustrating another embodiment of the present invention.

As shown in the second exemplary cross-section of the trailing edge section 18 in FIG. 3, the edge section 18 comprises three cured prepreg plies 58. Each ply 58 comprises prepreg tows 60, the tows 60 comprising a plurality of fibers 74 coated with a coating 62 selected from the group consisting of boron nitride, silicon nitride, silicon carbide and combinations thereof, as such coating 62 is known in the art, wherein the denier of each tow 60 is in the range of about 1400 to about 1800, such that each ply 58 has a thickness in the range of about 0.006 inch to about 0.007 inch. An interstitial ceramic material 64 is present between and surrounding the plies 58, tows 60, and fibers 74, such that the total thickness of the three cured plies 58 is in the range of about 0.018 inch to about 0.021 inch. The interstitial ceramic material 64 also forms the two interface regions 70 between the plies 58. Preferably, the three plies 58 do not have the same orientation. In the exemplary embodiment shown in FIG. 2, two outer plies 66 are oriented at 0°, while the middle ply 68 is oriented at 90°.

Figure 4:
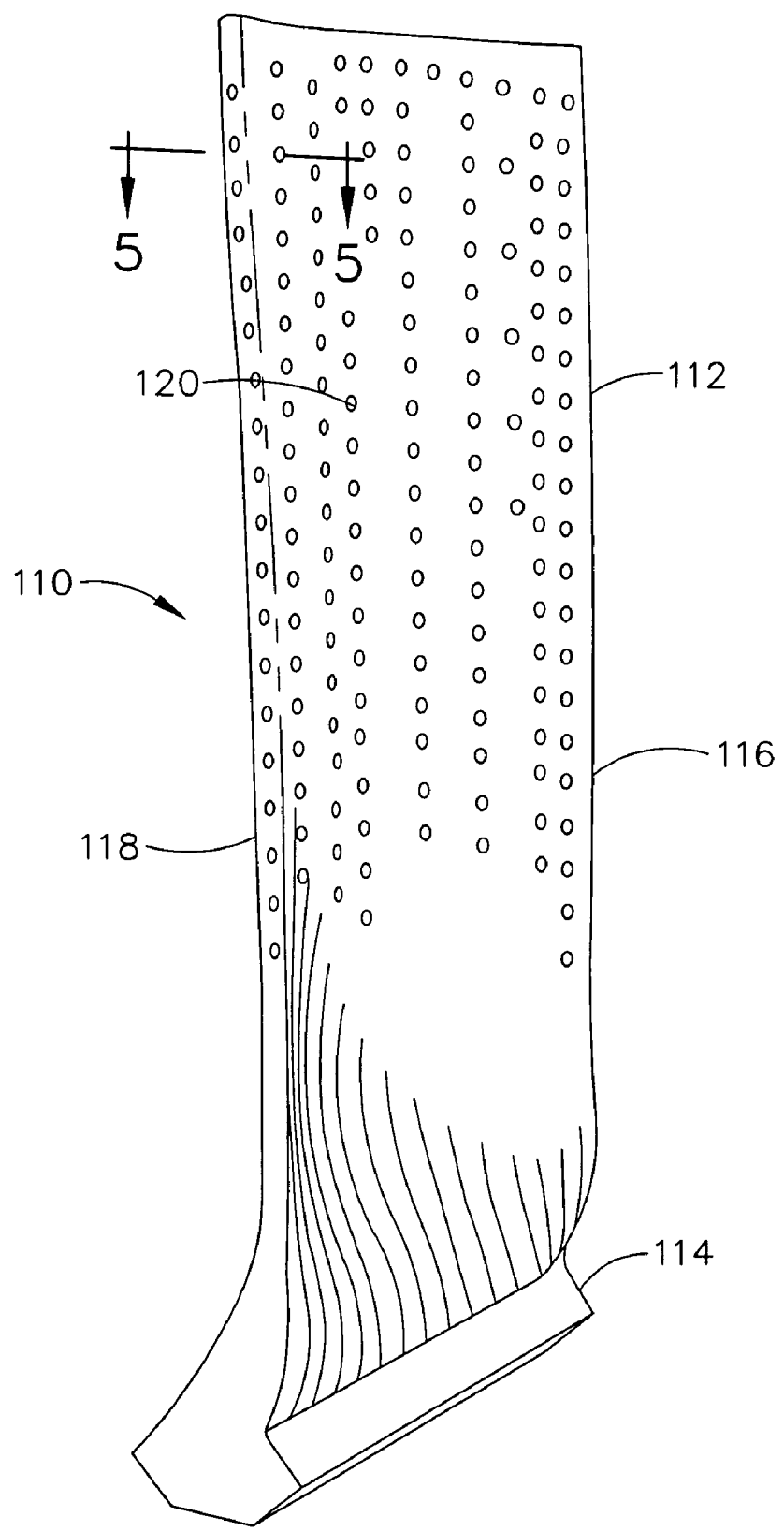
FIG. 4 is an example of a cooled CMC LPT blade for a gas turbine engine.

FIG. 4 depicts an exemplary helicopter gas turbine engine LPT cooled blade 110. In this illustration a turbine blade 110 comprises a ceramic matrix composite material. The turbine blade 110 includes an airfoil 112 against which the flow of hot exhaust gas is directed. The turbine blade 110 is mounted to a turbine disk (not shown) by a dovetail 114 that extends downwardly from the airfoil 112 and engages a slot of complimentary geometry on the turbine disk. The LPT blade 110 of the present invention does not include an integral platform. A separate platform is provided to minimize the exposure of the dovetail 114 to hot gases of combustion. The airfoil has a leading edge section 116 and a trailing edge section 118. The blade 110 is a relatively small component, and as shown in FIG. 1, the trailing edge section has a thickness in the range of about 0.015 inch to about 0.021 inch. The blade 110 further comprises cooling holes 120.

A CMC cooled turbine blade according to an embodiment is preferably a SiC/SiC composite material manufactured using the "prepreg" MI method. Such "prepregged" plies comprise silicon carbide-containing fibers, where the fibers are bundled into tows and the tows are all adjacent to one another such that all of the fibers are oriented in the same direction. By "silicon carbide-containing fiber" is meant a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide. These examples are given for demonstration of the term "silicon carbide-containing fiber" and are not limited to this specific combination. Other fiber compositions are contemplated, so long as they include silicon carbide.

In order to manufacture the cooled turbine blade 110 of the present invention, a preselected number of SiC prepregged plies are laid up in a preselected arrangement over a piece of tooling in a preselected shape forming a turbine blade shape, where the trailing edge section 18 has a cured thickness in the range of about 0.015 inch to about 0.021 inch. In order to have a trailing edge with sufficient structural integrity to withstand operation in a gas turbine engine, it is preferred to have at least two interface regions between the plies (i.e. three plies) to provide sufficient structural support.

These three plies that comprise trailing edge are preferably oriented such that all three plies are not oriented in the same direction. The remaining plies that do not pass through the small feature the trailing edge section 118 may be arranged in any appropriate orientation as known in the art. For example, the remaining plies could all be laid up in an alternating formation such that the remaining plies are at about a 0° orientation, followed by about a 90° orientation, followed by about a 0° orientation, followed by a −90° orientation, etc. as is known in the art, or such that the remaining plies are at a −45° orientation, followed by a 0° orientation, followed by a +45° orientation, followed by a 90° orientation, or in any other mechanically acceptable arrangement The next step of the process is forming a ceramic preform by heating the turbine blade shape by compression molding, bladder molding, or autoclaving as known in the art. The next step is removing the tooling by a physical, chemical, or thermal process. For example, the tooling may be machined out of the interior, or dissolved, etched away, or vaporized, depending on its material of construction. The next step of the process is densifying the preform with at least silicon, and preferably with boron-doped silicon to form a CMC turbine blade as known in the art. In one embodiment of carrying out the infiltration, the preform is contacted with molten silicon, which is infiltrated into the preform. U.S. Pat. No. 4,737,328, which is assigned to the assignee of the present invention, and which is hereby incorporated by reference in its entirety, discloses an infiltration technique. The final step is drilling cooling holes 120 by any means known in the art, for example by a Nd:YAG laser. Such use of an Nd:YAG laser is discussed in U.S. Pat. No. 6,670,026, which is assigned to the Assignee of the present invention, and which is hereby incorporated by reference in its entirety.

Figure 5:
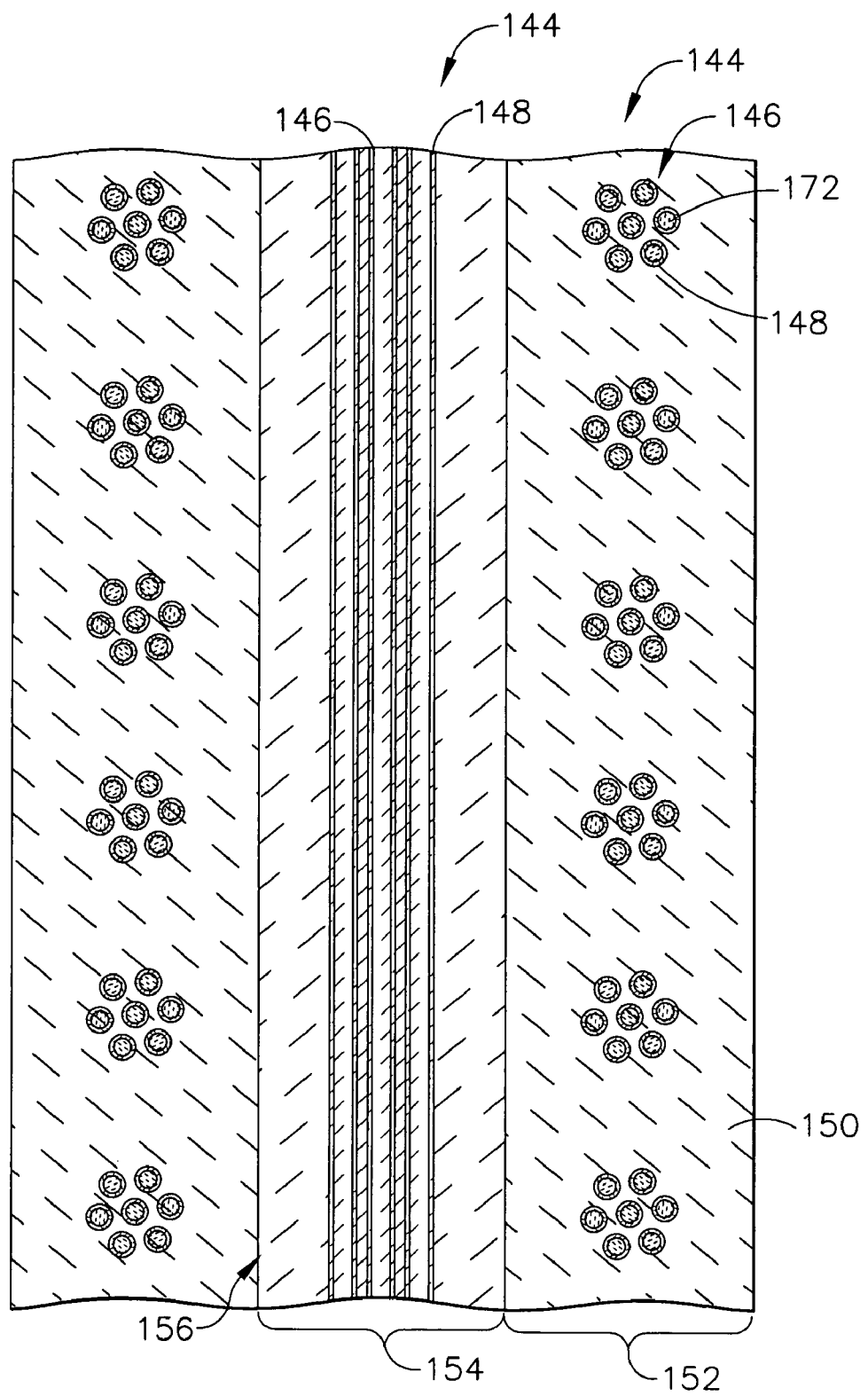
FIG. 5 is a cross-section of the uncooled CMC LPT blade of FIG. 4, taken at the line 5-5 illustrating one embodiment of the present invention.

As shown in the exemplary cross-section of the trailing edge section 118 in FIG. 5, the edge section 118 comprises three cured prepreg plies 144. Each ply comprises prepreg tows 146, the tows 146 comprising a plurality of fibers 172 coated with a coating 148 selected from the group consisting of boron nitride, silicon carbide and combinations thereof, as such coating 148 is known in the art, wherein the denier of each tow 146 is in the range of about 800 to about 1000, such that each tow 146 has a thickness in the range of about 0.005 inch to about 0.007 inch. An interstitial ceramic material 150 is present between and surrounding the plies 144, tows 146, and fibers 172, such that the total thickness of the three cured plies 144 is in the range of about 0.015 inch to about 0.021 inch. The interstitial ceramic material 150 also forms the two interface regions 156 between the plies. Preferably, the three plies 144 do not have the same orientation. In the exemplary embodiment shown in FIG. 5, two outer plies 154 are oriented at 0°, while the middle ply 154 is oriented at 90°.

A second approach is to use a relatively small amount of ceramic matrix material, such that the volume percentage of the matrix material in the blade 110 is in the range of about 60 percent to about 70 percent. Increasing the volume percent of the matrix may be accomplished by decreasing carbon content in the matrix and/or decreasing particle content to ensure ability to fully fill with silicon. Such a relatively low percentage of matrix material means that in order to achieve a thickness in the range of about 0.015 inch to about 0.020 inch, prepreg plies having a thickness in the range of about 0.005 inch to about 0.008 inch can be used.

Figure 6:
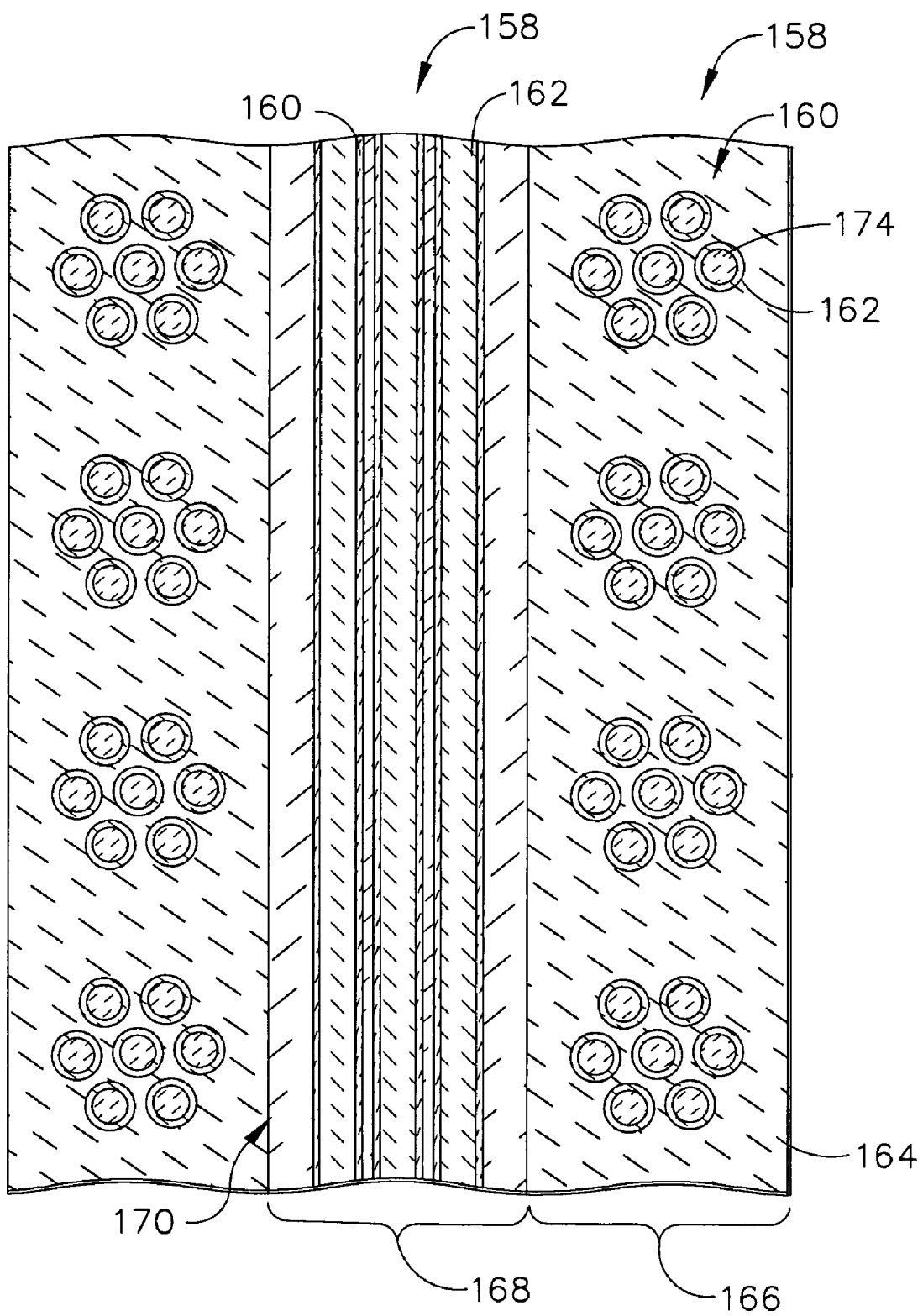
FIG. 6 is a cross-section of the uncooled CMC LPT blade of FIG. 4, taken at the line 5-5 illustrating another embodiment of the present invention.

As shown in the second exemplary cross-section of the trailing edge section 118 in FIG. 6, the edge section 118 comprises three cured prepreg plies 158. Each ply comprises prepreg tows 160 comprising a plurality of fibers 174 coated with a coating 162 selected from the group consisting of boron nitride, silicon carbide and combinations thereof, as such coating 162 is known in the art, wherein the denier of each tow 160 is in the range of about 1400 to about 1800, such that each tow 160 has a thickness in the range of about 0.006 inch to about 0.007 inch. An interstitial ceramic material 164 is present between and surrounding the plies 158, tows 160, and fibers 174, such that the total thickness of the three cured plies 158 is in the range of about 0.018 inch to about 0.021 inch. The interstitial ceramic material 164 also forms the two interface regions 170 between the plies 160. Preferably, the three plies 160 do not have the same orientation. In the exemplary embodiment shown in FIG. 2, two outer plies 166 are oriented at 0°, while the middle ply 168 is oriented at 90°.

While exemplary embodiments of the invention have been described with respect to a cooled and uncooled helicopter gas turbine engine LPT blade, it should be appreciated that the invention is not so limited and that the present invention also in addition, the prepreg plies and methods of the present invention may also be used to manufacture any gas turbine engine component having small features, including any ceramic matrix composite turbine engine component, such as any turbine blade, and uncooled turbine nozzle, a cooled turbine nozzle, wherein the component is initially laid up in a preselected arrangement using a preselected number of prepreg CMC plies to manufacture an article having small features requiring the use of cured plies having a thickness in the range of about 0.005 inch to about 0.008 inch.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A ceramic matrix composite gas turbine engine component comprising:
   a plurality of cured ceramic matrix composite plies, each ply comprising ceramic fiber tows, each ceramic fiber tow comprising a plurality of ceramic fibers, the tows in each ply lying adjacent to one another such that each ply has a unidirectional orientation;
   a coating on the ceramic fibers, the coating selected from the group consisting of boron nitride, silicon nitride, silicon carbide, and combinations thereof;
   a ceramic matrix material lying in interstitial regions between the fibers and tows of each ply and the interstitial region between the plurality of plies; and
   at least a portion of the component comprising cured ceramic matrix composite plies, wherein each ceramic ply in at least the portion has a thickness in the range of about 0.005 inch to about 0.008 inch, inclusive of tows, coating, and interstitial ceramic matrix material, wherein the total thickness in at least the portion is no greater than about 0.021 inch.

2. The gas turbine engine component of claim 1, wherein the component further comprises an airfoil.

3. The gas turbine engine component of claim 1, wherein the fibers are silicon carbide fibers.

4. The gas turbine engine component of claim 3, wherein the component is an uncooled turbine blade.

5. The gas turbine engine component of claim 3, wherein the component is a cooled turbine blade.

6. The gas turbine engine component of claim 1, wherein a volume percentage of the matrix material in at least the portion is in the range of about 60 percent to about 70 percent.

7. The gas turbine engine component of claim 1, wherein the thickness of each tow in at least the portion is in the range of about 0.002 inch to about 0.003 inch.

8. The gas turbine engine component of claim 2, wherein a volume percentage of the matrix material in at least the portion is in the range of about 60 percent to about 70 percent.

9. The gas turbine engine component of claim 2, wherein the thickness of each tow in at least the portion is in the range of about 0.002 inch to about 0.003 inch.

10. The gas turbine engine component of claim 4, wherein a volume percentage of the matrix material in at least the portion is in the range of about 60 percent to about 70 percent.

11. The gas turbine engine component of claim 4, wherein the thickness of each tow in at least the portion is in the range of about 0.002 inch to about 0.003 inch.

12. The gas turbine engine component of claim 5, wherein a volume percentage of the matrix material in at least the portion is in the range of about 60 percent to about 70 percent.

13. The gas turbine engine component of claim 5, wherein the thickness of each tow in at least the portion is in the range of about 0.002 inch to about 0.003 inch.

* * * * *